(12) United States Patent
De Campo et al.

(10) Patent No.: US 8,940,820 B2
(45) Date of Patent: Jan. 27, 2015

(54) PROCESS FOR STABILIZING HYPOPHOSPHITE

(75) Inventors: Floryan De Campo, Shanghai (CN); Annelyse Murillo, Shanghai (CN); Junli Li, Shanghai (CN); Tingting Zhang, Shanghai (CN)

(73) Assignee: Rhodia (China) Co., Ltd., Shanghai (CN)

( * ) Notice: Subject to any disclaimer, the term of this patent is extended or adjusted under 35 U.S.C. 154(b) by 0 days.

(21) Appl. No.: 13/502,835

(22) PCT Filed: Oct. 23, 2009

(86) PCT No.: PCT/CN2009/074584
§ 371 (c)(1),
(2), (4) Date: Apr. 19, 2012

(87) PCT Pub. No.: WO2011/047511
PCT Pub. Date: Apr. 28, 2011

(65) Prior Publication Data
US 2012/0208942 A1 Aug. 16, 2012

(51) Int. Cl.
*C08K 5/51* (2006.01)
*C01B 25/165* (2006.01)
*C09K 21/04* (2006.01)

(52) U.S. Cl.
CPC .............. *C01B 25/165* (2013.01); *C09K 21/04* (2013.01)
USPC ............................. 524/128; 524/414; 423/307

(58) Field of Classification Search
None
See application file for complete search history.

(56) References Cited

U.S. PATENT DOCUMENTS

| | | | |
|---|---|---|---|
| 2,724,718 A * | 11/1955 | Stiles et al. | ................. 558/137 |
| 5,225,052 A | 7/1993 | Takikawa et al. | |
| 2007/0173572 A1 | 7/2007 | Mediratta et al. | |

FOREIGN PATENT DOCUMENTS

| | | | |
|---|---|---|---|
| CN | 1011472591 | | 5/2008 |
| CN | 101268138 | | 9/2008 |
| CN | 101002982 | * | 12/2008 |
| CN | 101332981 | | 12/2008 |
| CN | 101332981 A | * | 12/2008 |
| CN | 101332982 | | 12/2008 |
| JP | 05-208804 A | | 8/1993 |
| JP | 2003-040609 A | | 2/2003 |
| WO | 2009/010812 | | 1/2009 |

OTHER PUBLICATIONS

Derwent Translation of CN 101332981 A, Purifying sodium hypophosphite product by carrying out chemical reactions, filtering acid adjusting liquid, working section of alkali and acid adjustments, and using vapor to heat and concentrate mixture Dec. 31, 2008, Derwent, pp. 1-3.*
Armarego, Wilfred Chai, Christina (2013). Purification of Laboratory Chemicals (7th Edition). Elsevier. Online version available at: http://app.knovel.com/hotlink/toc/id:kpPLCE0051/purification-laboratory.*
Full translation of Feng et al. CN 101332981, Process for Purifying Sodium Hypophosphite, pp. 1-13.*
Machine Translation of Feng et al. CN 101332982, Method for Producing Calcium Hypophosphite, pp. 1-9.*
Translation of CN101332982A, Feng et al. pages 1-7.*

* cited by examiner

*Primary Examiner* — Susannah Chung
*Assistant Examiner* — Robert T Butcher
(74) *Attorney, Agent, or Firm* — Cesari and McKenna, LLP

(57) ABSTRACT

A process for stabilizing hypophosphite salt is provided, which comprises the following steps: a) washing the hypophosphite salt at least one time under a controlled pH value of 4-11, preferably 5-8, as the said hypophosphite salt in an aqueous solution and/or in a solid state; and b) drying the said hypophosphite salt under reduced pressure to remove the volatiles. The process can prevent or minimize the formation of a dangerous quantity of phosphine from hypophosphite salts, more particularly in the flame retardant of the application. The flame retardant polymer composition is also provided, which comprises a polymer and the hypophosphite salt stabilized by the above process.

15 Claims, No Drawings

PROCESS FOR STABILIZING HYPOPHOSPHITE

CROSS REFERENCE TO RELATED APPLICATION

This application claims priority to international application no. PCT/CN2009/074584, filed Oct. 23, 2009. The contents of the prior application are incorporated herein in their entirety.

FIELD OF THE INVENTION

The current invention relates to a process for stabilizing hypophosphite salts and more particularly to a process for stabilizing hypophosphite salts used as flame retardants (hereinafter also known as "FR").

BACKGROUND OF THE INVENTION

Halogen free flame retardant additives are of increasing interest in reinforced and un-reinforced polymers, more particularly thermoplastic polymers, for their ability to provide FR properties while remaining environmentally benign. Among those halogen free flame retardants, hypophosphite salts or inorganic phosphinates are known as good FR additives for polymers. However, phosphinic acid salts may cause the degradation of the polymer to which they are added as mentioned for example in WO 2009/010812. Moreover, hypophosphite salts are known to have a tendency to generate phosphine at elevated temperatures at which they are processed, and phosphine is spontaneously flammable, highly toxic and strong irritant as mentioned for example in US 2007/0173572.

The proposed solution taught by US 2007/0173572 is to scavenge the generated phosphine by adding a phosphine suppressing additive which can be a specific polymer, an amide, imide, cyanurate, phosphazine among other products. The drawback of that method is that another additive is added to the polymer composition which can only neutralize the phosphine without preventing the generation of that phosphine.

Thus, there exists a constant need in the market of FR agents in having hypophosphites salts without the above drawbacks and that premature instability or at a much lower degree. There is a need to propose hypophosphite salts sufficiently stabilized in order not to generate a dangerous amount of phosphine.

DETAILED DESCRIPTION OF THE INVENTION

In fact, after extensive research and development work, the Applicant has surprisingly found out and developed a stabilizing process for hypophosphite salts which can prevent or, at the very least, minimise, the formation of phosphine from hypophosphite salts, more particularly in their application as FR.

The current invention actually relates to a process for stabilizing a hypophosphite salt, comprising the steps of:
a) washing the hypophosphite salt at least one time under a controlled value of pH comprised between 4 and 11, preferably between 5 and 8, said hypophosphite salt in an aqueous solution and/or in a solid state, and
b) drying said hypophosphite salt under reduced pressure to remove the volatiles.

It is recommended to performed step a) 2 or 3 times.

According to another aspect of the invention, the process further comprises after step a), the step of:
a1) washing at least one time said hypophosphite salt with an organic solvent miscible with water.

The organic solvent of step a) is preferably selected from the group comprising acetone, methanol, isopropanol, tetrahydrofurane, and acetonitrile.

The starting hypophosphite salt of step a) can be in the form of an aqueous solution, charged in a reactor and mixed with a mineral or an organic acid to obtain a slurry whose pH is set at a value of between 4 and 6.5, preferably 5 and 6.

The acid is preferably selected from the group comprising hypophosphorous acid, citric acid, maleic acid, acetic acid, chlorhydric acid and sulphuric acid and more preferably, the acid is hypophosphorous acid.

According to another aspect of the invention, the starting hypophosphite salt of step a) is in the form of an aqueous solution, charged in a reactor and mixed with a mineral or an organic base to obtain a slurry whose pH is set at a value of between 7.5 and 11, preferably 8 and 10.

In that case the base is preferably selected from the group comprising sodium hydroxide, potassium hydroxide, calcium hydroxide, calcium oxide, Magnesium oxide and magnesium hydroxide, even more preferably, the base is calcium hydroxide and/or calcium oxide.

Preferably, the starting hypophosphite salt comes from the reaction of calcium oxide, water and hypophosphorous acid.

The process can be batch, continuous or semi-continuous and be performed in a close or open system under inert atmosphere.

That inert atmosphere can be for example carbon dioxide, argon, or nitrogen.

The process of the invention can be performed under atmospheric pressure, under pressure or under vacuum.

Without linking the current invention to any theoretical rationale, it looks like most of the premature instability is due to the presence of problematic impurities. Thus it can be interesting to check the quality of the hypophosphite salts by detecting the remaining impurities using thermal analysis tools such as ARC (Adiabatic Reaction Calorimeter) and TGA (Thermal Gravimetric Analysis).

The test can be carried out at any stage during the heating process described before.

Another way to check the quality of the product is to perform a stability test at elevated temperature on the product alone or mixed with plastic and measure the amount of phosphine generated during the test. It is also possible to measure the amount of phosphine generated when the product is compounded with plastics such as polyamide.

The hypophosphite salt is preferably of the formula (1):

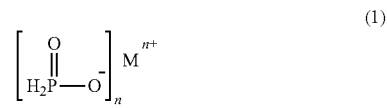

(1)

wherein n is 1, 2 or 3, and

M is a metal selected from the group consisting alkali metal, alkaline earth metal, aluminium, titanium and zinc. Preferably M is calcium or aluminium. The hypophosphite salt to be treated can have been prepared by any manufacturing process. The hypophosphite salts and in particular, calcium hypophosphite, can be prepared for example from white phosphorus ($P_4$) reacted under alkaline conditions with calcium hydroxide or calcium oxide and water as taught by U.S. Pat. No. 5,225,052.

It is also possible to obtain calcium hypophosphite by reaction of a calcium salt or simply from lime as taught by Chinese patent CN101332982, with hypophosphorous acid. For example the lime suspension is simply neutralized with hypophosphorous acid, the impurities are removed by filtration and the product isolated in a same way as previously described.

Finally, it can also be possible to obtain calcium hypophosphite from other metallic hyphosphites or the acid by ion exchange process.

The invention also relates to the use of the stabilized hypophosphite salt for rendering polymers and more particularly, thermoplastic polymers, flame-retardant.

The invention relates to a flame retardant polymer composition comprising a polymer and 0.1 to 30 weight percent based on the total weight of the composition of a hypophosphite salt thermally stabilized by the process of the current invention.

The thermoplastic polymers are preferably, polyphenylene ethers, polyamides, polyesters, polycarbonates and blends or polymer blends. These include polymers of mono- or diolefins, for example polypropylene, polyisobutylene, of mono- or of diolefins with one another or with other vinyl monomers, polystyrene and their copolymers, halogen-containing polymers, e.g. polychloroprene, chlorinated rubber, polyacrylates and polymethacrylates, polyamides and copolyamides derived from diamines and from dicarboxylic acids and/or from aminocarboxylic acids or from the corresponding lactams.

Thermoplastic polymers can further comprise fillers and reinforcing materials and/or other additives, in order to obtain plastic molding compositions. The invention is further illustrated by the following examples.

EXAMPLES

CaHypo COM: CaHypo COM was made from the commercial grade of calcium hypophosphite sourced from Shanghai lingfeng chemical reagent co., ltd.

CaHypo HT: Cahypo High Temperature (product treated)

Example 1

CaHypo COM (102 g) is charged in a reactor and mixed with water (161 g). 50% hypophosphorous acid (34 g) is then added slowly and the mixture is thoroughly stirred for 30 minutes and the pH is controlled between 4 and 6. Then, the slurry is filtered to afford 75 g of solid. This solid is washed with water (40 g) and then with acetone (75 g). 57.8 g of wet solid is thus obtained to finally afford 56 g of dry CaHypo-HT after evaporation of the volatiles under reduced pressure overnight at room temperature.

Example 2

Thermal Aging Test 2 g of CaHypo COM and CaHypo HT (from Example 1) are weighed and placed in separate glass vials. The vials are then placed into an oven pre-heated to 290° C. under air. Pictures of the samples are then taken over time to compare the change of color. The pictures obtained, shown below, clearly indicate that CaHypo HT does not change color as quickly as the regular CaHypo commercial grade. The CaHypo COM material starts yellowing significantly between 1 to 5 h while the CaHypo HT did not yellow before 8 h. The yellowing of CaHypo is typically due to the formation of red phosphorus which is itself associated with the formation of phosphine.

The results are gathered in table 1 below:

TABLE 1

| | Time | | | | |
|---|---|---|---|---|---|
| | 0 h | 1 h | 5 h | 8 h | 15 h |
| Non-treated CaHypo | White | White | Pale yellow | Yellow | Dark yellow/orange |
| Stabilized CaHypo | White | White | White | Pale yellow | yellowish |

Example 3

Phosphine Generation—Scrubber Detection

For this experiment 2 g of CaHypo (COM or HT from Example 1) are heated to 300° C. for 30 minutes under a flow of argon. The out gases are bubbled through a 5% hydrogen peroxide solution to scrub phosphine that may be generated. The scrubber solution is then analyzed by Ion Chromatography (IC) to determine the level of phosphate. The phosphine generated is then calculated by assuming that all the phosphate detected is issued from phosphine. For CaHypo COM, a total of 555.8 ppm of phosphine/g of CaHypo is detected while only 235 ppm of phosphine/g of CaHypo is detected for CaHypo HT. Overall, under these conditions the amount of phosphine generated by CaHypo HT is reduced by about 60% compared to the commercial product.

Example 4

For this experiment 2 g of CaHypo (COM or HT from Example 1) are heated to 298° C. under a flow of argon. The out gases are captured into gas bags and the concentration of phosphine is measured over time using Caltec tubes. The results (Table 2) clearly indicate that the amount of phosphine generated with CaHypo HT is up to 34 times lower which corresponds to a 97% reduction of the amount of phosphine generated compared to commercial CaHypo.

TABLE 2

| Phosphine generation | | |
|---|---|---|
| | Total Phosphine generated (mL) for 2 g of CaHypo | |
| Time | CaHypo COM | CaHypo-HT (Example 1) |
| 0.5 h | 0.17 | 0.01 |
| 1.5 h | 0.79 | 0.02 |
| 3.0 h | 2.15 | 0.06 |

2 g sample heated to 298° C. with argon flushing at rate 58 mL/mins

Example 5

Water Wash

CaHypo COM (275 g) is charged in 1 L plastic bottle and mixed with water (119 g) as well as ceramic balls (293 g). The resulting mixture is rotated for 4 h and the pH is controlled between 4-6. Then the balls are separated with wired filter. The white solid is washed with water (40 g) and then three times with acetone to afford 242 g of wet CaHypo-HT. The final product is dried under reduced pressure at room temperature to remove any volatile and afforded 240 g of product.

Example 6

Phosphine Generation Measuring $PH_3$ in Gas

For this experiment 2 g of CaHypo (COM or HT from Example 5) are heated to 298° C. under a flow of argon. The out gases are captured into gas bags and the concentration of phosphine is measured over time using Caltec tubes. The results (Table 3) clearly indicated that the amount of phosphine generated with CaHypo HT is up to 140 times lower which corresponded to a 99.3% reduction of the amount of phosphine generated compared to commercial CaHypo.

TABLE 3

Phosphine Generation

| Time | Total Phosphine generated (mL) | |
|---|---|---|
| | CaHypo COM | CaHypo-HT (Example 5) |
| 0.5 h | 0.36 | 0.01 |
| 1.5 h | 2.12 | 0.02 |
| 3.0 h | 4.24 | 0.03 |

2 g sample heated to 298° C. with argon flushing at rate 58 mL/mins.

Example 7

Phosphine Generation Measuring $PH_3$ in Gas—CaHypo+PA 6,6

In this experiment, 6 g of PA6,6 are charged in a glass tube and heated to 298° C. for 3 h flushing with argon. Then 2 g of CaHypo (COM or HT from Example 5) are added. After that, the out gases are captured into gas bags and the concentration of phosphine is measured over time using Caltec tubes. The results (Table 4) clearly indicate that the amount of phosphine generated with CaHypo HT is up to 74 times lower which corresponds to a 98.7% reduction of the amount of phosphine generated compared to the commercial CaHypo.

TABLE 4

Phosphine generation with PA 6,6

| Time | Total Phosphine generated (mL) | |
|---|---|---|
| | CaHypo COM | CaHypo-HT (Example 5) |
| 0.5 h | 0.18 | 0.02 |
| 1.5 h | 1.06 | 0.05 |
| 3.0 h | 7.42 | 0.10 |

2 g sample + 6 g PA 6,6 heated to 298° C. with argon flushing at rate 58 mL/mins.

Example 8

Preparation of CaHypo-HT from CaO and HPA

Calcium oxide (39.2 g, 0.7 mol) is mixed with water (398 g) under inert atmosphere. 50% hypophosphorous acid (129 g, 0.98 mol) is added slowly at room temperature while the pH is monitored. The pH is adjusted to 5-7 and the solution boiled for 3 h. Then, the mixture is cooled down and a portion of it filtered to obtain 284 g. This filtrate is pH adjusted to 6.5-7 and water is distilled off under reduced pressure to afford 252 g of distillate. After cooling down the solution is filtered to afford 8.6 g of CaHypo-HT. The product is dried under vacuum at 90° C. overnight.

The product thus obtained is tested for phosphine generation by heating 2 g of material to 298° C. under argon while analyzing the off-gases for phosphine. The results indicated that after 30 minutes the total amount of phosphine generated is as low as 0.007 mL which is 51 times lower that the amount detected for CaHypo COM in the same conditions. Overall, the phosphine generation is reduced by 98.1% compared to commercial CaHypo.

Example 9

Recrystallization Treatment

CaHypo COM (418 g) is dissolved in water (3012 g) under inert atmosphere and heated to reflux. The pH of the solution is adjusted to 9-10 using lime and the mixture refluxed for 2 h. After cooling down to room temperature the solution is filtered. The filtrate is then pH adjusted to between 6 and 7 using 50% hypophosphorous acid and then filtered again. The resulting solution is concentrated under reduced pressure until CaHypo precipitated. The solid thus obtained is filtered out at room temperature to afford 307 g of wet material. After drying the product under reduced pressure at 120° C. for 6 h 297 g of product is in hand.

Example 10

Phosphine Generation Measuring $PH_3$ in Gas

For this experiment 2 g of CaHypo (COM or HT from Example 9) are heated to 298° C. under a flow of argon. The out gases are captured into gas bags and the concentration of phosphine is measured over time using Caltec tubes. The results (Table 5) clearly indicate that the amount of phosphine generated with CaHypo HT is up to 70 times lower which corresponds to a 98.6% reduction of the amount of phosphine generated compared to the commercial CaHypo.

TABLE 5

Phosphine generation

| Time | Total Phosphine generated (mL) | |
|---|---|---|
| | CaHypo COM | CaHypo-HT (Example 10) |
| 0.5 h | 0.36 | 0.01 |
| 1.5 h | 2.12 | 0.04 |
| 3.0 h | 4.24 | 0.06 |

2 g sample heated to 298° C. with argon flushing at rate 58 mL/mins.

Example 11

Phosphine Generation Measuring $PH_3$ in Gas—Grinded Sample

CaHypo HT obtained in Example 9 is found to have a particle size superior to 100 microns. Some of this product is grinded using wet ball milling to reach a particle size inferior to 50 microns. The material thus obtained is then tested for phosphine evolution by heating 2 g to 298° C. under argon and by analyzing the off-gases for phosphine. The results are summarized in Table 6 and compared to the results obtained with CaHypo COM in the same conditions. The amount of phosphine generated is 35 times lower with CaHypo HT which corresponded to 97.3% reduction compared to the commercial product. This experiment shows that adjusting the particle size of CaHypo HT does not alter its performance.

TABLE 6

Phosphine generation

| | Total Phosphine generated (mL) | |
|---|---|---|
| Time | CaHypo COM | CaHypo-HT (Example 11) |
| 0.5 h | 0.36 | 0.02 |
| 1.5 h | 2.12 | 0.05 |
| 3.0 h | 4.24 | 0.12 |

2 g sample heated to 298° C. with argon flushing at rate 58 mL/mins.

Example 12

Compounding and Injection Molding of CaHypo HT

A sample of Example 11 (grinded CaHypo HT) is tested on an extruder and injection molding machine to verify that it is safe to compound. The product is compounded in polyamide 6,6 containing 30% of glass fibers with a maximum processing temperature of 260° C. Two formulations have been tested, 10% of CaHypo HT and 20% of CaHypo HT. In both cases, the extrusion went well without any issues. During the experiment the phosphine level is detected using Caltec tubes with a detection level of 0.05 ppm. When samples of vent gases are analyzed no phosphine could be detected indicating that the level of phosphine is inferior to 0.05 ppm.

The two formulations are then inject molded to prepare 0.8 mm specimens with a temperature of 270° C. The phosphine is also measured during this process and found to be inferior to 0.05 ppm.

The invention claimed is:

1. A process for stabilizing a hypophosphite salt, comprising the steps of:
    step a) washing a starting hypophosphite salt at least one time under a pH value of 5 to 6 in an aqueous solution or in a solid state to obtain a washed hypophosphite salt, and
    step b) drying the washed hypophosphite salt to remove volatiles to obtain a stabilized hypophosphite salt,
wherein the hypophosphite salt is of the formula (1):

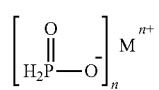

(1)

wherein n is 1, 2, or 3, and M is a metal selected from the group consisting of alkali metal, alkaline earth metal, aluminium, titanium, and zinc.

2. The process according to claim 1, wherein step a) is performed 2 or 3 times.

3. The process according to claim 1, further comprising after step a) and before step b), the step of:
    a1) washing at least one time the washed hypophosphite salt with an organic solvent miscible with water.

4. The process according to claim 3, wherein the organic solvent of step a1) is selected from the group consisting of acetone, methanol, isopropanol, tetrahydrofuran, and acetonitrile.

5. The process according to claim 1, wherein the starting hypophosphite salt of step a) is in the form of an aqueous solution, charged in a reactor and mixed with a mineral or an organic acid to obtain a slurry whose pH is set at between 5 and 6.

6. The process according to claim 5, wherein the acid is selected from the group consisting of hypophosphorous acid, citric acid, maleic acid, acetic acid, chlorhydric acid, and sulphuric acid.

7. The process according to claim 5, wherein the acid is hypophosphorous acid.

8. The process according to claim 1, wherein the starting hypophosphite salt originates from the reaction of calcium oxide, water, and hypophosphorous acid.

9. The process according to claim 1, wherein M is calcium or aluminium.

10. A flame retardant polymer composition comprising a polymer and the hypophosphite salt stabilized by the process as defined in claim 1, wherein the hypophosphite salt is 0.1 to 30 weight percent of the composition.

11. The flame retardant polymer composition according to claim 10, wherein the polymer is a thermoplastic selected from polyphenylene ethers, polyamides, polyesters, polycarbonates and blends or polymer blends.

12. The process according to claim 2, further comprising after step a) and before step b), the step of:
    a1) washing at least one time the washed hypophosphite salt with an organic solvent miscible with water.

13. The process according to claim 12, wherein the organic solvent of step a1) is selected from the group consisting of acetone, methanol, isopropanol, tetrahydrofuran, and acetonitrile.

14. The process according to claim 3, wherein the organic solvent of step a1) is selected from the group consisting of acetone, methanol, isopropanol, tetrahydrofuran, and acetonitrile.

15. The process according to claim 2, wherein the starting hypophosphite salt of step a) is in the form of an aqueous solution, charged in a reactor and mixed with a mineral or an organic acid to obtain a slurry whose pH is set at a value of between 5 and 6.

* * * * *